ent Office 3,271,377
Patented Sept. 6, 1966

3,271,377
POLYMERIZABLE 2-ALKYLENE-m-DIOXANYL ACRYLIC ESTERS
Gerald J. Mantell, Kansas City, Mo., David Rankin, Kansas City, Kans., and Francis R. Galiano, Kansas City, Mo., assignors, by mesne assignments, to Gulf Oil Corporation, Pittsburgh, Pa., a corporation of Pennsylvania
No Drawing. Filed May 23, 1962, Ser. No. 196,915
35 Claims. (Cl. 260—88.3)

This invention relates to novel acrylic organic compounds. More particularly, it relates to novel acrylic esters having a 2-alkylene-m-dioxanyl acrylic ester structure represented by the following formula:

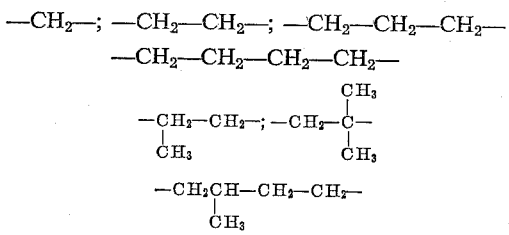

wherein R is hydrogen or a lower alkyl radical (preferably hydrogen or methyl), and $R_1$ and $R_2$ are selected from the group consisting of hydrogen, alkyl, and phenyl radicals. Also, in the formula, A represents a divalent alkylene radical having a chain length of one to four carbons.

A in the above formula can represent either a straight chain alkylene radical or a branched alkylene radical. Illustrative radicals are:

—CH$_2$—; —CH$_2$—CH$_2$—; —CH$_2$—CH$_2$—CH$_2$—

—CH$_2$—CH$_2$—CH$_2$—CH$_2$—

$$-\text{CH}_2-\text{CH}_2-\underset{\underset{\text{CH}_3}{|}}{\overset{\overset{\text{CH}_3}{|}}{}}-; -\text{CH}_2-\underset{\underset{\text{CH}_3}{|}}{\overset{\overset{\text{CH}_3}{|}}{\text{C}}}-$$

$$-\text{CH}_2\text{CH}-\text{CH}_2-\text{CH}_2-$$
$$\underset{\text{CH}_3}{|}$$

and the like.

When one or both of $R_1$ and $R_2$ is an alkyl or phenyl radical, the alkyl or phenyl radicals are free of substituents which substantially interfere with the reactions by which the 2-alkylene-m-dioxanyl acrylic esters of this invention are formed. Permissible substituents on $R_1$ and $R_2$ radicals can be lower alkyl such as methyl, ethyl, or cycloalkyl, nitro, halo such as chloro or bromo, dialkyl amino such as dimethylamino and the like substituents without departing from the spirit of the hereby provided invention.

When one or both of $R_1$ and $R_2$ is alkyl, alkyl has desirably one to eight carbon atoms, preferably one to four carbon atoms. The alkyl radical can be unbranched such as methyl, ethyl, n-octyl, and the like; it can be branched such as isopropyl, t-butyl, isoamyl, 2-ethylhexyl, and the like; it can be cyclic such as cyclopentyl, cyclohexyl, cycloheptyl, and the like; it can be cycloalkyl alkyl such as cyclohexylethyl; or $R_1$ and $R_2$ can be joined to form a cycloalkyl group in which the carbon occupying position 5 in the dioxanyl ring is one of the ring forming carbons of the cycloalkyl ring.

The 2-alkylene-m-dioxanyl acrylic esters of this invention are generally relatively high boiling liquids which frequently have freezing points at about room temperature or below. The acrylates of this invention can be homopolymerized or copolymerized with another polymerizable ethylenically unsaturated compound to form interpolymers.

The acrylic dioxanyl esters of this invention can readily be prepared by an ester exchange reaction represented by the following equation:

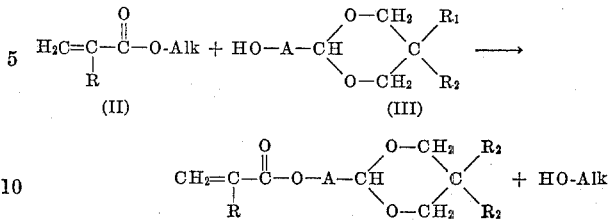

wherein Alk represents a suitable alkyl group, preferably methyl or ethyl and wherein R, $R_1$, $R_2$, and A have the definitions set forth above.

The ester exchange reactions by which the compounds of this invention are provided are conducted at an elevated temperature at which the desired 2-m-dioxanyl acrylic ester is stable. Ordinarily it has been found useful to include in the reaction an ester exchange catalyst such as an alkyl titanate, e.g., tetrabutyl titanate, or any other useful ester exchange catalyst such as an alkali metal alkoxide, or an alkali metal oxide, hydride or hydroxide, or the like. The catalysts can be employed in general in amounts which are catalytic quantities in ester exchange reactions. For example, when tetrabutyl titanate is employed, it has been found suitable to employ about 0.01 to 0.1 mole of the catalyst per mole of the $R_1R_2$-substituted dioxanyl alcohol employed. It is preferable in carrying on the reaction to maintain the reaction temperature at a temperature above the boiling point of the by-product alcohol (Alk-OH) but below temperatures at which the desired 2-alkylene-m-dioxanyl acrylic ester polymerizes. It is desired during the preparation to remove any of the produced by-product alcohol by distillation, thereby enabling the reaction to go to a greater completion. During the reaction it is also highly desired to include in the reaction mixture a polymerization inhibitor, for example, a tertiary butylated phenol such as 2,6-ditertiarybutyl-4-methyl phenol, 2,6-ditertiarybutyl-4-methoxy phenol, and the like.

The ester exchange reaction is also preferably, whenever possible, conducted at a high concentration of reactants. Usually it can be conducted in the absence of diluents particularly when the 2-hydroxyalkyl dioxanyl intermediate employed (III) is of a low melting character. However, if desired and if their presence supplements the conversion of the desired acrylic esters, inert reaction solvents can be employed such as dioxane, toluene, xylene, and the like.

The desired acrylic dioxanyl esters are isolated from the ester exchange reaction mixture by conventional procedures. For example, a relatively crude fraction of the desired dioxanyl esters can be obtained from the reaction mixture by fractional distillation. The crude products can be further purified as by extraction, precipitation, or distillation procedures of common knowledge to the art. In treating a reaction mixture containing certain catalysts such as tetrabutyl titanate, it is advisable to destroy residual catalyst activity prior to isolation treatment. The catalyst activity can readily be destroyed by first adding to the reaction mixture an inert water immiscible solvent in which the desired ester is soluble, for example, benzene, toluene, or the like. Then, distilled water is added thereto. The two phase liquid system is shaken whereupon the desired acrylic ester is taken up in the organic phase and removed from the mixture. The organic phase is filtered and is dried with a suitable drying agent such as anhydrous sodium sulfate, and the dried solution of the produced 2-alkylene-m-dioxanyl acrylic esters are stripped of solvents. The product residue can be further purified as by fractionally distilling through common conventional distillation procedures.

The 2-hydroxyalkylene-m-dioxanyl intermediate alcohols (III) can be provided following conventional condensation procedures illustrated by the following reaction:

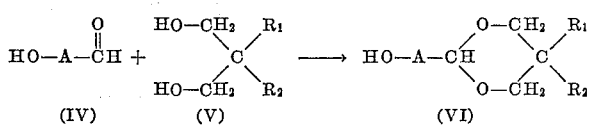

(IV)  (V)  (VI)

It is seen that intermediate IV is a suitable hydroxy aliphatic aldehyde and intermediate V is an appropriately substituted 1,3-propane diol.

In carrying on the above described condensation of intermediates IV and V, in accordance with conventional procedures, it is useful to employ an acid condensation catalyst such as p-toluene sulfonic acid. The reaction is caried out ordinarily at a suitable elevated temperature. The produced m-dioxanyl alcohol (VI) is recovered following conventional procedures, such as by distillation.

Certain suitable hydroxy aldehydes can be readily prepared by following conventional aldol condensation reactions by which the hydroxy aldehydes (IV) can be provided as illustrated as follows:

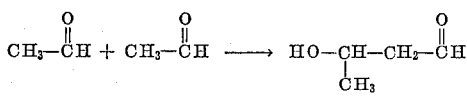

In carrying on any of the above reactions, the preparative temperatures should be maintained at a temperature below which neither polymerization nor pyrolysis reactions affecting the ring structure occurs. At times it will be desired to conduct the reactions at below atmospheric pressures in order to avoid the necessity of high temperatures.

The 2-m-dioxanyl esters of this invention can be polymerized by following known methods for polymerizing acrylic type monomers. Polymerization can be conducted following bulk, solution, suspension, or emulsion polymerization techniques. Conventional catalysts can be employed, and are ordinarily advisably used. Such referred to conventional polymerization catalysts include peroxide free-radical initiators such as benzoyl peroxide, tertiary butyl hydroperoxide, tertiary butyl perbenzoate, and azo-type free-radical catalysts such as alpha,alpha'-azobis-(isobutyronitrile), alpha,alpha'-azobis(ethyl isobutyrate) and alpha,alpha-azobis(isobutyramide), and persalts such as potassium persulfate and the like.

The esters of this invention can also be copolymerized with one or more ethylenically unsaturated monomers polymerizable therewith such as the alkyl esters of acrylic or methacrylic acid such as methyl methacrylate, ethyl acrylate, octyl acrylate and benzyl acrylate; acrylamides such as methacrylamide; vinyl esters such as vinyl chloride and vinyl acetate; vinylidene chloride; acrylonitrile; allyl compounds such as diallyl adipate, vinyl aryl compounds such as styrene and divinyl benzene; and other unsaturated compounds like butadiene and maleic anhydride. It is to be understood that at times some of the above mentioned monomers will not polymerize in all concentrations or in all proportions with all of the m-dioxanyl acrylic esters provided hereby. Copolymers can be provided wherein a very small but effective quantity of one or more of the above m-dioxanyl acrylic esters are incorporated. For example, an effective quantity of an acrylic dioxanyl ester can be as small as about one percent by weight up to about ninety-nine percent by weight. Preferably, the acrylic dioxanyl esters of this invention are contained in the polymers of the order of at least about two to about ninety percent by weight. It is to be understood that the exact concentration will vary depending upon the particular acrylic dioxanyl ester employed as well as the other ethylenically unsaturated monomer or monomers employed.

It is to be further understood that copolymers can be made with a mixture of two or more of the novel acrylic dioxanyl esters with or without utilization of additional ethylenically unsaturated monomers.

Polymers of this invention can be cross linked. It appears that the presence of oxygen is necessary for a reasonably rapid curing, assuming the groups of the polymers corresponding to the above 2-alkylene-m-dioxanyl acrylic esters are the sites of cross linking in the polymers. Surprisingly, acid curing does not presently appear to be a feasible means of cross linking, whether performed in the presence or absence of moisture or glycol. Also, curing with a free-radical peroxide catalyst does not appear to be rapid in the absence of oxygen. In the oxygen curing, the presence of an amount of a peroxide free-radical catalyst, e.g., about one or two percent by weight of dicumyl peroxide, at times augments the curing. Curing temperatures employed are temperatures such as temperatures of about 120° C. or greater, preferably temperatures of about 140° C. to about 220° C.

Certain agents and certain controls can be usefully employed in the polymerizations involving the acrylic ester. For example, control of temperatures and pressures can greatly contribute to the character of the end polymer products. It has been found that when oxygen is excluded in, for example, a solution polymerization of the m-dioxanyl acrylic esters, the end polymers are solvent soluble. However, if oxygen is present during the polymerization, apparently cross linking occurs and the end polymers are largely solvent insoluble. Certain agents acting as telogens can be employed. If emulsion polymerization is employed, emulsifying agents will be added such as fatty acid soaps, fatty acid esters of polyalkylene glycols, sulfated alcohols or the like.

The polymers provided hereby are useful in coating various objects, as adhesives and are useful in molding and casting operations. For example, the polymer can be ordinarily dissolved in a suitable solvent and laid down as a cast film. The end polymers can be foamed or they can be cross-linked as by application of heat or by the incorporation of an acid catalyst or a peroxide catalyst into the polymer mix in the presence of oxygen.

The following examples illustrate the provided invention but are not to be interpreted as being in limitation thereof except as defined by the appended claims:

*Example 1*

Neopentyl glycol (1.0 mole, 104 g.) and pentaldol (1.0 mole, 102 g.) are added to 175 ml. of water in a round-bottom flash equipped with a stirrer, a reflux condenser and a thermometer. The solution pH is adjusted to pH 3 by the addition of p-toluene sulfonic acid hydrate and the acidified mixture is heated overnight (16 hrs.) at 75° C. The oil which forms solidifies on cooling the reaction mixture. The solid consisting of the desired substituted ethanol is removed by filtration, is washed with water and is dried. The dried crude beta,beta-dimethyl-beta - (5,5 - dimethyl-2-m-dioxanyl) ethanol is obtained in a yield of 165.5 g. and melts at 63–65° C. On recrystallization from hexane, the melting point of the product appears to be unchanged.

*Example 2*

To a mixture of 58.7 g. (0.31 mole) of beta, beta-dimethyl-beta - (5,5-dimethyl-2-m-dioxanyl)ethanol prepared as described above and 108 g. (1.25 moles) of methyl acrylate are added 0.3 g. of 2,6-ditertiarybutyl-4-methyl phenol and 7 ml. of tetrabutyl titanate. The reaction flask is attached to a distillation column consisting of two insulated 12 inch Vigreux colums. Heat is applied and a methyl acrylate-methyl acohol azeotrope (54% methanol) boiling at 62.5–63° C. is removed continuously over a one and one-half hour period. After a substantial amount of azeotrope is removed, the temperature rises to about 80° C. at which point a quantity of methyl acrylate is distilled off. The reaction mixture is cooled and is stripped of excess methyl acrylate. Benzene (50 ml.) is added to the reaction residue containing the desired dioxane and the mixture is shaken vigorously with 3 ml. of water, thereby destroying the catalyst activity. The benzene extract is filtered, is dried over anhydrous sodium sulfate, is stripped of solvents, and is finally fractionally distilled employing the column described hereinabove. A fraction of the desired beta,beta-dimethyl-beta-(5,5-dimethyl-2-m-dioxanyl)ethyl acrylate is collected at the following distillation conditions: 44.0 g. (58.2%) boiling at 69° C./0.25 mm. Hg.

*Elemental analysis.*—Calculated for $C_{13}H_{22}O_4$: C, 64.42%; H, 9.16%. Found: C, 64.63%, H, 9.36%.

Example 3

The procedure of Example 2 is repeated employing an equimolar quantity of methyl methacrylate instead of methyl acrylate to provide the corresponding beta,beta-dimethyl-beta-(5,5-dimethyl-2-m-dioxanyl)ethyl methacrylate having a boiling point of 80.5–82° C./0.5 mm.

*Elemental analysis.*—Calculated for $C_{14}H_{24}O_4$: C, 65.62%; H, 9.38%. Found: C, 65.67%; H, 9.51%.

Example 4

The procedure of Example 2 is repeated employing an equimolar quantity of beta,beta-dimethyl-beta-(2-m-dioxanyl)ethanol as the alcohol to provide the corresponding beta,beta-dimethyl-beta-(2m-dioxanyl)ethyl acrylate.

Example 5

The procedure of Example 2 is repeated employing an equimolar quantity of beta,beta-dimethyl-beta-(2-m-dioxanyl)ethanol as the alcohol and methyl methacrylate as the acrylic acid intermediate to provide the corresponding beta,beta-dimethyl-beta-(2-m-dioxanyl) methacrylate.

Example 6

Other 2-alkylene-m-dioxanyl acrylic esters can be provided by following essentially the process of Example 2. The appropriate 2-hydroxyalkylene-m-dioxane having the necessary $R_1$ and $R_2$ substituents is employed as the alcohol. The required 2-hydroxyalkylene-m-dioxane can be prepared by condensing a suitable $R_1R_2$ substituted 1,3-propane diol and appropriate hydroxy aldehyde (HO-A-OH) according to, in general, the procedures of condensation described in Example 1 above. The 2-hydroxyalkylene-m-dioxane alcohol intermediate is condensed with a methyl acrylic ester (viz., methyl acrylate, methyl methacrylate, or methyl ethacrylate) to provide the following m-dioxanyl acrylic ester compounds:

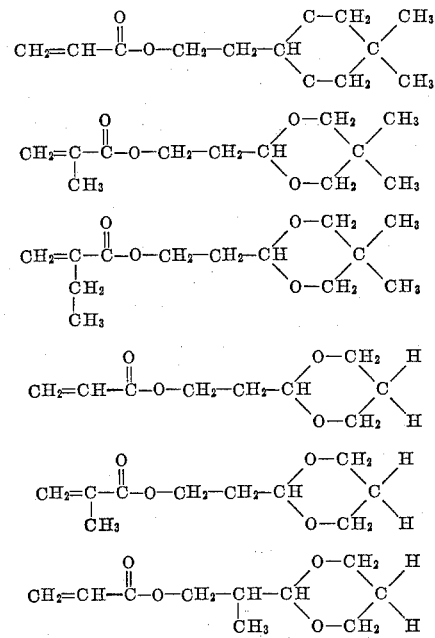

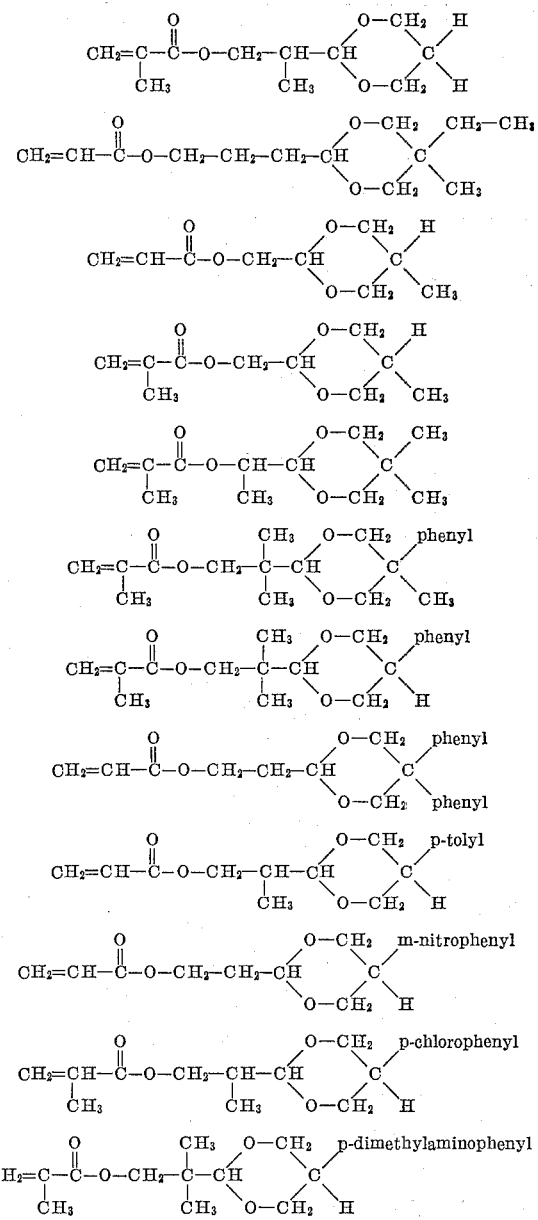

Example 7

A bulk polymerization of beta, beta-dimethyl-beta-(5,5-dimethyl-2-m-dioxanyl)ethyl methacrylate is carried out in glass polymerization cells prepared in the following manner. Two glass plates having the dimensions ¼″ x 4″ x 6″ were beveled on one edge. These cells are washed, are dried, and are coated with a 1% solution of dichlorodimethylsilane in petroleum ether. Igepal CO–630 (a polyethylene oxide phenol condensation surfactant product sold by General Aniline & Film Company) is then spread on the surface, and is subsequently washed off thoroughly with distilled water. After drying, the plates are stacked on top of each other, spaced along the three non-beveled edges with moist strips of cellophane. The cell is then sealed on these three edges with a gelatin-glycerin mixture containing a small amount of water and is placed in an oven at 100° C. for several hours to harden the seal.

The polymerization is carried out as follows: beta,beta-dimethyl-beta-(5,5-dimethyl-2-m-dioxanyl)ethyl methacrylate (2.0 g.) is mixed with 2 mg. (0.1%) of alpha, alpha′-azoisobutyronitrile as initiator. The material is then introduced into the polymerization cell by means of a syringe. When the cell is completely filled, the top edge is sealed with the gelatin mixture and is placed in an oven at 60° C. for eighteen hours. The material then has "set" and the temperature is raised to 120° C. over a two-hour period and kept at that temperature for an additional six hours. After cooling, the polymer, consisting of homopolymerized beta,beta-dimethyl-beta-(5,5-dimethyl-2-m-dioxanyl)ethyl methacrylate is removed by scraping off the gelatin seal and separating the plates. The homopolymer is solvent insoluble.

*Example 8*

A solution polymerization of beta,beta-dimethyl-beta (5,5-dimethyl-2-m-dioxanyl)ethyl methacrylate is carried out as follows: Benzene (12 ml.) is refluxed under argon for one-half hour in a 100-ml., three-neck, round bottom flask equipped with a gas inlet, reflux condenser, syringe cap, and a magnetic stirring bar. Argon is also bubbled through a quantity of monomer 10 ml. of beta,beta-dimethyl-beta(5,5-dimethyl-2-m-dioxanyl)ethyl methacrylate for one-half hour at room temperature. The catalyst, alpha,alpha′, azobisisobutyronitrile (0.050 g.), is then dissolved in the above monomer mixture. The monomer-initiator mixture is added dropwise by a syringe to the boiling benzene mixture over a period of one-half hour. After three and one-half hours at reflux, additional benzene (2 ml.) is added. In seven hours after the last benzene addition, 2 ml. more benzene is added. The reaction mixture is then heated overnight (sixteen hours) at 50° C. After cooling, 50 ml. of benzene is then added and the reaction mixture is poured into a large amount of vigorously stirred methanol (1000 ml.). The methanol is suction filtered separating a white solid consisting of the homopolymer, of beta,beta-dimethyl-beta-(5,5-dimethyl-2-m-dioxanyl)ethyl methacrylate. The solid polymer is again stirred with 500 ml. of fresh methanol, is filtered, and is dried under vacuum. The polymer product is solvent soluble, has a softening point of 118–125° C., and a Barcol hardness value of 84.

*Example 9*

Following the procedure of Example 8, beta-beta-dimethyl-beta-(5,5-dimethyl-2-m-dioxanyl)ethyl acrylate is polymerized to form a homopolymer which is soluble in benzene (i.e., solvent soluble), has an inherent viscosity of 0.25 in tetrahydrofuran at 25° C. at a concentration of 0.5 g./100 ml., softens at 45–55° C., and has a Barcol hardness value of 65.

*Example 10*

Following the procedure of Example 8, a monomer composition consisting of 25 parts by weight of beta,-beta-dimethyl-beta-(5,5-dimethyl-2-m-dioxanyl)ethyl methacrylate and 75 parts of by weight of methyl methacrylate is copolymerized to form a copolymer thereof which is solvent soluble, softens at 120–130° C., has an inherent viscosity of 0.57 in tetrahydrofuran at 25° C. at a concentration of 0.5 g./100 ml., and has a Barcol hardness value of 88.

*Example 11*

Following the procedure of Example 8, a monomer composition consisting of 25 parts by weight of beta, beta-dimethyl-beta - (5,5-dimethyl-2-m - dioxanyl)ethyl methacrylate and 75 parts of by weight of m-butyl acrylate is copolymerized to form a rubbery copolymer thereof which is solvent soluble.

*Example 12*

The copolymerization of beta,beta-dimethyl-beta-(5,5-dimethyl-2-m-dioxanyl)ethyl methacrylate (4.8 g.) styrene (5.9 g.) is carried out in an emulsion system. Sodium lauryl sulfate is dissolved in 12 ml. of distilled water and the monomer mixture is placed in an addition funnel and shaken vigorously to emulsify the monomers. A solution of 0.22 g. of potassium persulfate and 0.010 g. of potassium carbonate in 1 ml. of water is added and the mixture shaken again. A portion (7 ml.) of this material is added to a 100 ml.-round bottom flask equipped with a paddle stirrer, a reflux condenser and a gas inlet. The reaction mixture is heated to 90° C. in an argon atmosphere and is stirred rapidly. After one hour, the remaining monomer emulsion is added dropwise over a one-hour period. The temperature is maintained for an additional hour after which time the emulsion is filtered through a 50-micron screen. The polymer can be coagulated if desired by following conventional coagulation procedures.

Following the polymerization procedures set out in Examples 7, 8, and 12, the remaining 2-akylene-m-dioxanyl esters of Examples 1–6 can be homoploymerized and copolymerized with copolymerizable ethylenically unsaturated monomers, e.g., acrylonitrile, butadiene, styrene, methyl acrylate, and the like.

*Example 13*

In illustration of curing of the polymers of this invention, benzene-soluble, homopolymers of beta,beta-dimethyl-beta-(5,5-dimethyl-2-m-dioxanyl)ethyl acrylate or methacrylate have been cured under the conditions and with the results as described below. The weights of curing agents are given in percentages by weight based on the weight of the polymer.

A homopolymer of beta,beta-dimethyl-beta-(5,5-dimethyl-2-m-dioxanyl)ethyl acrylate cured in an atmosphere of air at 150° C. for 30 minutes in the absence of any added curing agent provides a mostly insoluble cured polymer having a pencil hardness value of 4H and after 90 minutes provides a completely insoluble polymer having a pencil hardness value of 6H; at 150° C. in an air atmosphere with one percent by weight of dicumyl peroxide added provides a completely insoluble cured polymer after 30 minutes having a pencil hardness value of 2H and after 90 minutes a completely insoluble polymer having a pencil hardness value of 9H; and at 150° C. in an air atmosphere in the presence of two percent by weight of p-toluene sulfonic acid provides a partially insoluble cured polymer after 30 minutes having a pencil hardness value of 4H and after 90 minutes a completely insoluble cured polymer having a pencil hardness value of 6H.

A homopolymer of beta,beta-dimethyl-beta-(5,5-dimethyl-2-m-dioxanyl)ethyl methacrylate cured at 146° C. in the presence of air and with two percent of p-toluene sulfonic acid after about 15 hours provides a cured polymer completely insoluble and having a pencil hardness value of 9H; at 146° C. in dry air employing two percent by weight of p-toluene sulfonic acid provides a solvent soluble product after one hour having a pencil hardness value of 5H and after about 15 hours a completely insoluble polymer having a pencil hardness value 9H; at 146° C. in a dry air atmosphere employing two percent by weight of dicumyl peroxide provides after 60 minutes a polymer product mostly insoluble and having a pencil hardness value of 6H and after about 15 hours with one percent dicumyl peroxide under the same conditions a completely insoluble polymer having a pencil hardness value of 9H; at 146° C. in a moist argon atmosphere either in the presence or absence of two percent by weight of p-toluene sulfonic acid after about 15 hours provides a soluble polymer having a pencil hardness value of 5H; and at 146° C. in a dry argon atmosphere employing either no added curing agent or two percent by weight of p-toluene sulfonic acid or one percent by weight of dicumyl peroxide provides after six hours in each instance a soluble polymer product having a pencil hardness value of about 5H whereas in contrast at the same temperature in an atmosphere of dry air employing one percent by weight of dicumyl peroxide in one-half the time (three hours) provides a mostly insoluble product having a pencil hardness value of 6H.

What is claimed is:

1. A polymerizable 2-alkylene-m-dioxanyl acrylic ester represented by the following formula:

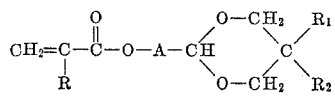

wherein R is selected from the group consisting of lower alkyl radicals and hydrogen, A represents a divalent alkylene radical having a carbon chain length of 1 to 4 carbons, $R_1$ and $R_2$ are selected from the group consisting of hydrogen, alkyl, phenyl and alkyl and phenyl having attached thereto substituents selected from the group consisting of lower alkyl, cycloalkyl, nitro, chloro, bromo and dialkylamino.

2. A polymerizable acrylic ester of claim 1 wherein the compound is an ester of acrylic acid.

3. A polymerizable acrylic ester of claim 1 wherein the compound is an ester of methacrylic acid.

4. A polymerizable compound of the formula:

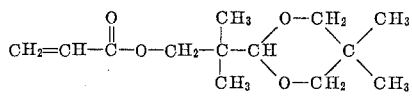

5. A polymerizable compound of the formula:

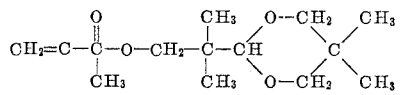

6. A polymerizable compound of the formula:

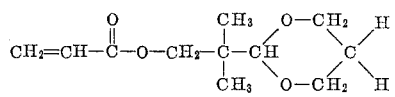

7. A polymerizable compound of the formula:

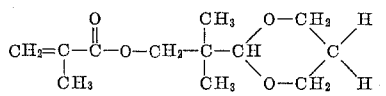

8. A polymerizable compound of the formula:

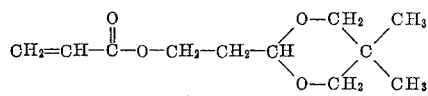

9. A polymerizable compound of the formula:

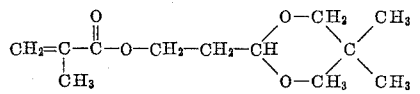

10. A polymerizable compound of the formula:

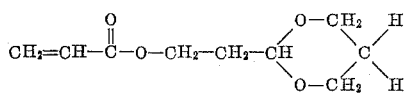

11. A polymerizable compound of the formula:

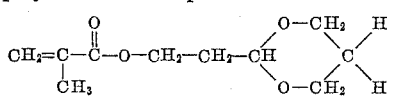

12. A homopolymer of a compound of claim 1.
13. A homopolymer of a compound of claim 2.
14. A homopolymer of the polymerizable ester of claim 3.
15. A homopolymer of the polymerizable ester of claim 4.
16. A homopolymer of the polymerizable ester of claim 5.
17. A homopolymer of the polymerizable ester of claim 6.
18. A homopolymer of the polymerizable ester of claim 7.
19. A homopolymer of the polymerizable ester of claim 8.
20. A homopolymer of the polymerizable ester of claim 9.
21. A homopolymer of the polymerizable ester of claim 10.
22. A homopolymer of the polymerizable ester of claim 11.
23. A copolymer of a compound of claim 1 and another polymerizable ethylenically unsaturated monomer of the general formula $H_2C=C<$.
24. A copolymer of a compound of claim 2 and another polymerizable ethylenically unsaturated monomer of the general formula $H_2C=C<$.
25. A copolymer of the compound of claim 3 and another polymerizable ethylenically unsaturated monomer of the general formula $H_2C=C<$.
26. A copolymer of the compound of claim 4 and another polymerizable ethylenically unsaturated monomer of the general formula $H_2C=C<$.
27. A copolymer of the compound of claim 5 and another polymerizable ethylenically unsaturated monomer of the general formula $H_2C=C<$.
28. A copolymer of the compound of claim 6 and another polymerizable ethylenically unsaturated monomer of the general formula $H_2C=C<$.
29. A copolymer of the compound of claim 7 and another polymerizable ethylenically unsaturated monomer of the general formula $H_2C=C<$.
30. A copolymer of the compound of claim 8 and another polymerizable ethylenically unsaturated monomer of the general formula $H_2C=C<$.
31. A copolymer of the compound of claim 9 and another polymerizable ethylenically unsaturated monomer of the general formula $H_2C=C<$.
32. A copolymer of the compound of claim 10 and another polymerizable ethylenically unsaturated monomer of the general formula $H_2C=C<$.
33. A copolymer of the compound of claim 11 and another polymerizable ethylenically unsaturated monomer of the general formula $H_2C=C<$.
34. A process of providing a crosslinked polymer which comprises heating a polymer having groups corresponding to a 2-alkylene-m-dioxanyl acrylic ester of claim 1 in an oxygen atmosphere at an elevated curing temperature.
35. A process of providing a crosslinked polymer which comprises heating a polymer having groups corresponding to a 2-alkylene-m-dioxanyl ester of claim 1 in an oxygen atmosphere in the presence of a free-radical curing agent.

References Cited by the Examiner

UNITED STATES PATENTS

| | | | |
|---|---|---|---|
| 2,680,735 | 6/1954 | Fegley et al. | 260—86.1 |
| 2,924,607 | 2/1960 | Pattison | 260—88.3 |
| 2,975,156 | 3/1961 | Fekete | 260—86.1 |

JOSEPH L. SCHOFER, *Primary Examiner.*

JOSEPH R. LIBERMAN, *Examiner.*

H. WONG, *Assistant Examiner.*